US008232923B2

United States Patent
Yang (10) Patent No.: US 8,232,923 B2
(45) Date of Patent: Jul. 31, 2012

(54) ANTENNA STRUCTURE OF A RADIO FREQUENCY IDENTIFICATION SYSTEM TRANSPONDER

(75) Inventor: Yung-Shu Yang, Taipei (TW)

(73) Assignee: Polychem UV/EB International Corp., Taipei (TW)

( * ) Notice: Subject to any disclaimer, the term of this patent is extended or adjusted under 35 U.S.C. 154(b) by 0 days.

(21) Appl. No.: 12/426,254

(22) Filed: Apr. 19, 2009

(65) Prior Publication Data

US 2011/0284641 A1    Nov. 24, 2011

(30) Foreign Application Priority Data

Sep. 16, 2008 (TW) .............................. 97135536 A (51) Int. Cl.
*H01Q 1/38* (2006.01)
(52) U.S. Cl. ................. 343/700 MS; 343/793; 343/795; 340/572.7
(58) Field of Classification Search ............... 340/572.7; 343/700 MS, 793, 795, 803, 805
See application file for complete search history.

(56) References Cited

U.S. PATENT DOCUMENTS

| 6,421,013 B1 * | 7/2002 | Chung | 343/700 MS |
| 7,158,033 B2 | 1/2007 | Forster | |
| 2006/0043198 A1 * | 3/2006 | Forster | 235/492 |

* cited by examiner

*Primary Examiner* — Dieu H Duong
(74) *Attorney, Agent, or Firm* — Muncy, Geissler, Olds & Lowe, PLLC (57) ABSTRACT

The present invention is an antenna structure of a radio frequency identification system transponder, especially an antenna structure wherein an insulation layer and a foldback circuit, an opening of which faces toward a coupling part, are provided at corresponding positions of an antenna body which is provided with the coupling part. The foldback circuit is provided with a radio frequency integrated circuit, such that radio signals can be transmitted by induction by the foldback circuit and the coupling part. By this foldback circuit, an issue of directivity of the radio signals can be reduced, an effective read range of the radio signals can be increased, as well as a near field induction function and a far field induction function can be provided at a same time. Therefore, when manufacturing an RFID transponder, a production speed can be increased and production cost can be reduced.

24 Claims, 11 Drawing Sheets

ANTENNA STRUCTURE OF A RADIO FREQUENCY IDENTIFICATION SYSTEM TRANSPONDER

BACKGROUND OF THE INVENTION a) Field of the Invention

The present invention relates to a wireless induction technology, and more particularly to an antenna structure of an RFID (Radio Frequency Identification System) transponder.

b) Description of the Prior Art

An RFID utilizes a reader to send out radio waves to a transponder in order to perform data identification, access and management. A working principle of the RFID utilizes a resonant circuit which is constituted by the antenna to emit or receive a radio signal that contains a chip identification code, to perform data identification and transmission. Therefore, the transponder can be widely applied in logistics management, production line automation, warehouse management, access control management, airport baggage management, smart tags and all kinds of stored value tickets or cards.

Figure 1:
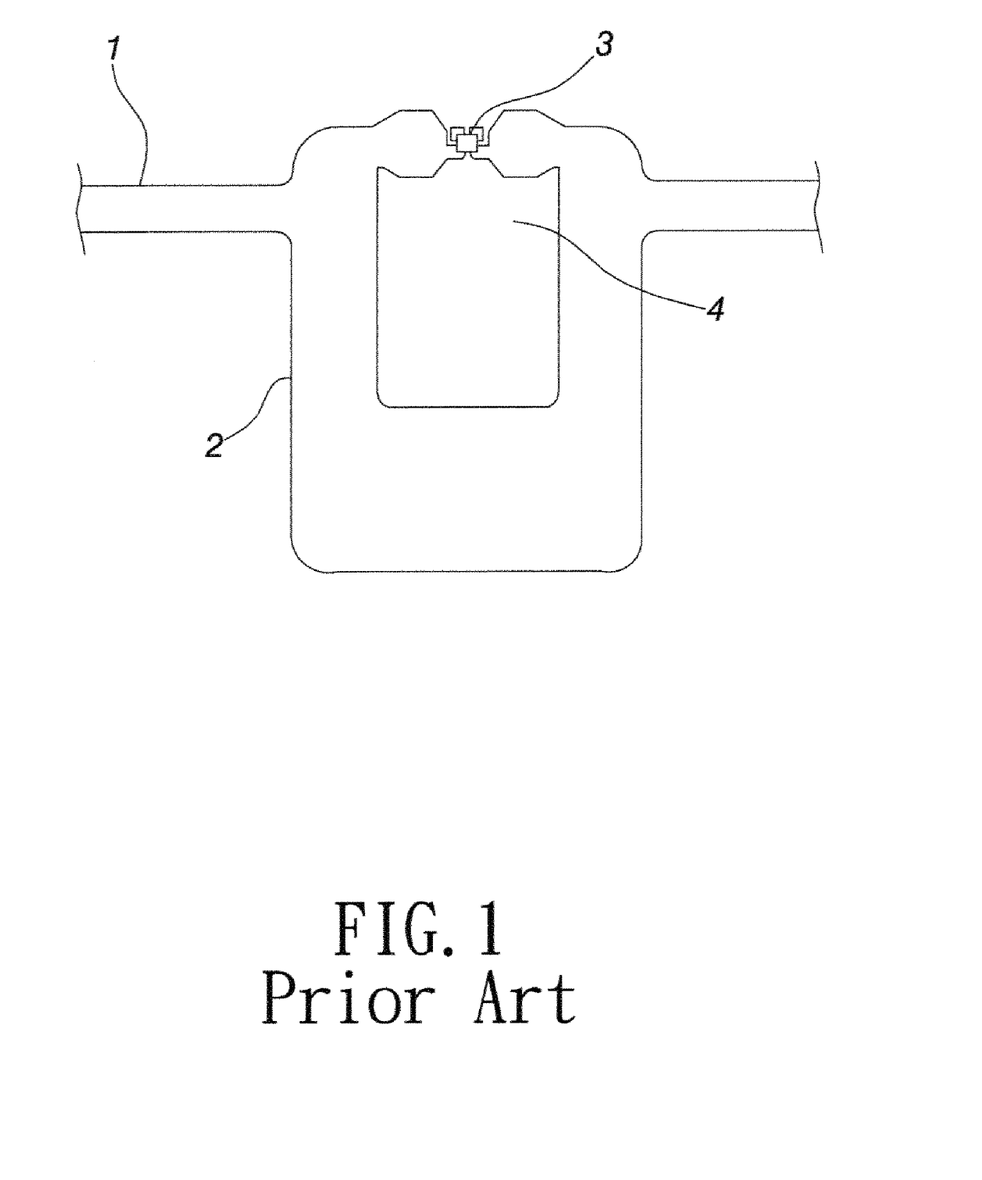
FIG. 1 shows a schematic view of a structure of a conventional RFID antenna.

As shown in FIG. 1, an antenna 1 in a transponder is constituted by a conductive material, and a proper position of the conductive material is provided with a winding coupling part 2 and an RFIC (Radio Frequency Interface Chip) 3, with the aforementioned radio signal (resonant signal) that contains the chip identification code being produced by the RFIC 3 and transmitted back to a reader through the antenna 1 that is constituted by the conductive material.

The aforementioned RFIC 3 is electrically connected at a disconnection position of the winding coupling part 2 to switch on a circuit, allowing a control signal of the RFIC 3 to be transmitted onto the coupling part 2. However, as the aforementioned coupling part 2 is in a winding shape, a gap 4 is formed at the disconnection position, such that when the antenna 1 is emitting the radio signals, stronger directivity is available toward the gap 4 of the coupling part 2. Accordingly, in terms of an entire covering range of the signals, the covering range of the inducible signals will be smaller for the signals with the stronger directivity.

On the other hand, the antenna 1 of the RFID transponder is rarely provided with functions of near field induction (within 3 times of the wavelength of the radio wave) and far field induction (beyond 3 times of the wavelength of the radio wave) at a same time.

Figure 2:
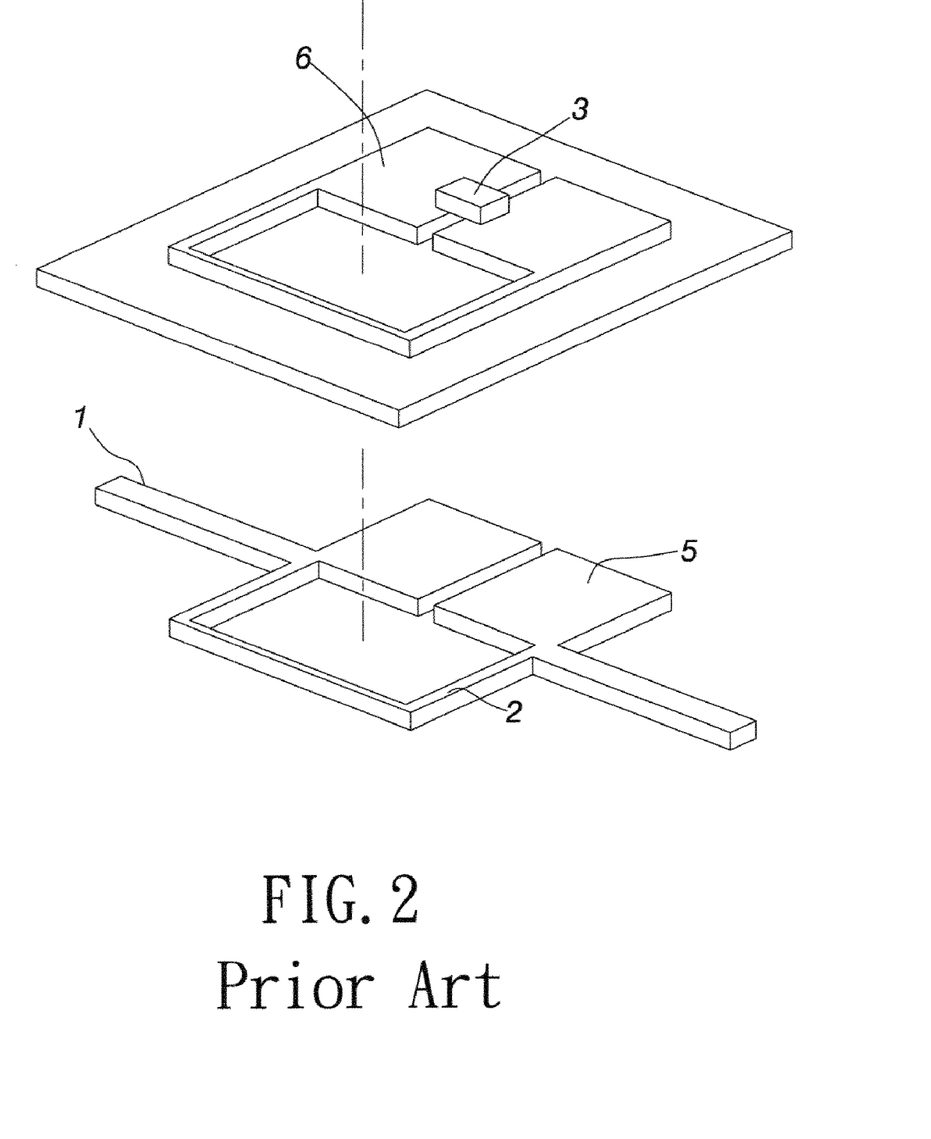
FIG. 2 shows a schematic view of a structure of a conventional magnetic and capacitive coupling antenna.

FIG. 2 shows a schematic view of a structure of another conventional dipole antenna, wherein a coupling part 2, which is made by a conductive material, of an antenna 1, is provided with a magnetic coupling element 5, with a capacitive coupling element 6 which contains an RFIC 3 being overlapped vertically on a corresponding position of the magnetic coupling element 5, so as to transmit the signals by a coupling effect of the magnetic coupling element 5 and the capacitive coupling element 6.

For this kind of antenna design that utilizes the capacitive coupling, such as that disclosed by the U.S. Pat. No. 7,158,033 B2, the magnetic coupling element 5 is required additionally to be provided on the antenna 1 to match with the capacitive coupling element 6. In addition, as the capacitive coupling element 6 and the magnetic coupling element 5 are overlapped correspondingly in the vertical direction, requirement to the structure is higher, and if no conductive regions or other corresponding methods are provided, then the issues of antenna directivity and the covering range of signals still cannot be solved.

SUMMARY OF THE INVENTION

The primary object of the present invention is to provide an antenna structure of an RFID transponder by which the directivity issue of the radio signals of the transponder can be reduced, an effective read range of the antenna can be increased, and functions of near field induction and far field induction (emission/receiving) can be available at a same time.

Accordingly, the antenna structure of the present invention is provided with an insulation layer at a relative position of a coupling part of an antenna body, and a foldback circuit, an opening of which faces toward the coupling part, with a radio frequency integrated circuit being provided on the foldback circuit, such that the foldback circuit can be switched on electrically and radio signals can be transmitted by induction by the foldback circuit and the coupling part. When operating, the directivity of the radio signals can be reduced and the effective read range of the antenna can be increased, by the foldback circuit.

In a real application, only a part of the aforementioned foldback circuit needs to be overlapped vertically with, aligned side by side with or close to the coupling part of the antenna body, that the foldback circuit can be directly induced with the antenna body, without being electrically connected with the coupling part nor requiring a specific magnetic or capacitive coupling element.

Upon implementation, the aforementioned antenna body and the foldback circuit can be printed on a non-conductive antenna substrate and an insulation layer by utilizing conductive ink (e.g., the conductive ink that contains silver or the UV (ultraviolet) curable silver conductive ink), followed by being affixed together, so as to reduce production cost. It is preferably to utilize the UV curable silver conductive ink. Of course, it is also feasible to use other manufacturing processes, such as copper or aluminum etching, electroplating, vapor deposition or sputtering.

Moreover, due to that the technology of printed electronics is getting matured, the conventional RFID chip can be also replaced by the printed electronics RFIC, which can reduce the production cost significantly and facilitate fully automatic production as well.

As the signals are directly transmitted by the electromagnetic induction between the aforementioned foldback circuit and the antenna body, when implementing the insulation layer between the foldback circuit and the antenna body, the foldback circuit and the RFIC can be provided on the insulation layer first, and then are fixed at the corresponding position of the aforementioned coupling part of the antenna body, by using pressure sensitive adhesive, double side tape, adhesion agent, hot melt adhesive, ultrasonic welding, high-frequency welding or thermo-compression.

It is worthy mentioned that the antenna body is extended outward to form an antenna part which can be generally divided into a segmented dipole antenna, a single folded dipole antenna, a double folded dipole antenna, a circular loop antenna and a square or ectangular loop antenna, according to design.

In comparison with the prior art, the antenna body of the present invention is provided with the insulation layer at the position corresponding to the coupling part, and the foldback circuit, the opening of which faces toward the coupling part, with the foldback circuit being provided with the RFIC circuit. When the antenna is operating, the directivity of the radio signals can be reduced, the effective read range of the antenna can be increased, as well as the near field induction and the far field induction (emission/receiving) can be provided at the same time, by the foldback circuit with the opening that faces toward the coupling part.

Besides, as there is no need to specifically provide the magnetic coupling element between the aforementioned foldback circuit and the antenna for electrically connecting with the antenna body that the induction with the antenna can be achieved, large tolerances of up, down, left and right positioning locations and angles of the aforementioned foldback circuit are available when manufacturing, such that the foldback circuit can be fixed on the antenna to produce the transponder without utilizing high precision and high cost production equipment, thereby effectively reducing the production cost.

Moreover, embodiments of the aforementioned printed antenna, foldback circuit and printed electronics RFIC can be accomplished by printing in the entire manufacturing process, thereby decreasing the production cost significantly.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 3:
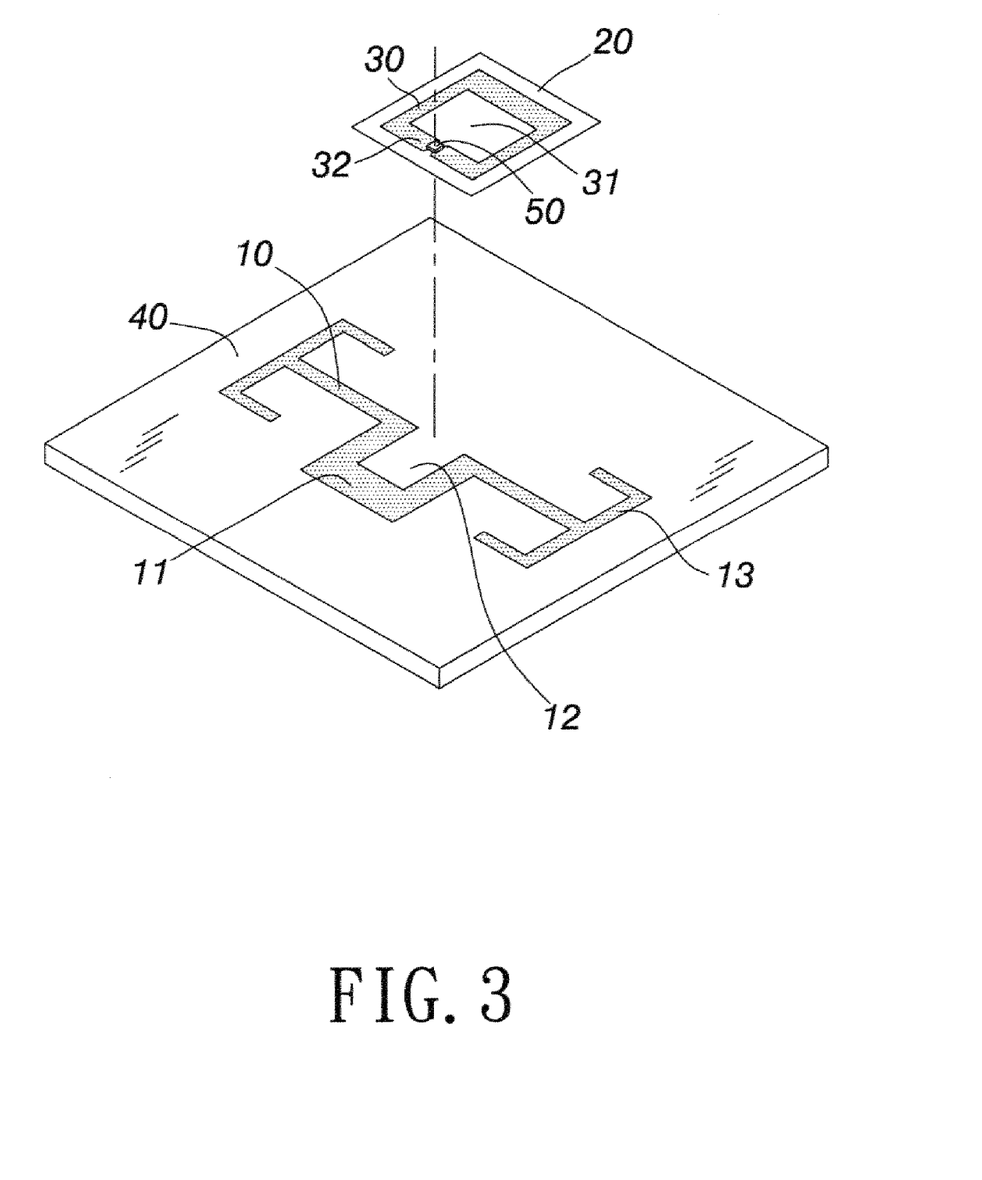
FIG. 3 shows a three-dimensional exploded view of a first embodiment of an antenna structure of the present invention.
Figure 4:
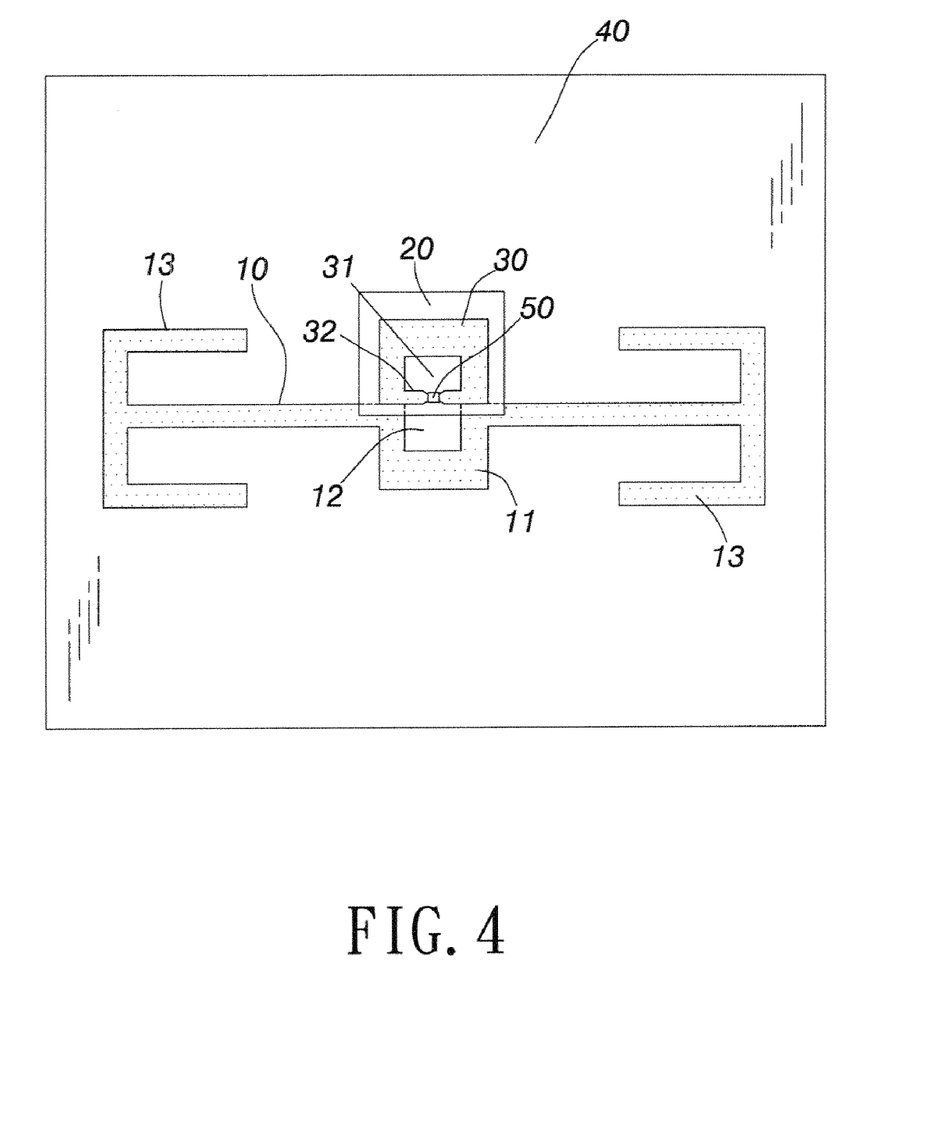
FIG. 4 shows a plan view of an antenna structure of a first embodiment of the present invention.

Referring to FIG. 3 and FIG. 4, a first embodiment of an antenna structure of an RFID transponder of the present invention comprises an antenna body 10 which is provided with a coupling part 11. A foldback circuit 30 which includes an insulation layer 20 is provided on the antenna body 10, the coupling part 11 is in a winding shape and is provided with a gap 12; whereas, the antenna body 10 is extended outward from two sides of the coupling part 11 to form antenna parts 13. Upon implementation, the antenna body 10 that includes the coupling part 11 and the antenna parts 13 can be provided on a non-conductive antenna substrate 40, and according to design, the antenna parts 13 can have various shapes, such as a dipole antenna, not limited by the shape of the antenna parts 13 in the drawings.

The aforementioned foldback circuit 30 is in the winding shape, and the gap 12 corresponding to the coupling part 11 is provided with an opening 31 which faces toward the coupling part 11, wherein, the opening 31 of the foldback circuit 30 is further provided with conductive parts 32 which are extended inward from two sides of the opening 31 and are close to each other, and an RFIC 50 is provided at the opening 31 or between the conductive parts 32 at two sides, so as to switch on the foldback circuit 30 electrically, thereby forming a loop circuit.

In the drawings, the loop circuit that is constituted by the foldback circuit 30 and the RFIC 50 is a square loop circuit. However, when implementing, it is also feasible to use a circular loop circuit, an elliptical loop circuit, a rectangular loop circuit, a triangular loop circuit or a polygonal loop circuit, not limited by the shape as shown in the drawings.

When the antenna of the present invention is operating, signals emitted or received by the RFIC 50 are transmitted by electromagnetic induction between the foldback circuit 30 and the coupling part 11; whereas, when the signals are being transmitted, the directivity of radio signals can be reduced and the effective read range can be increased, by that the opening 31 of the foldback circuit 30 faces toward the coupling part 11.

Figure 5:
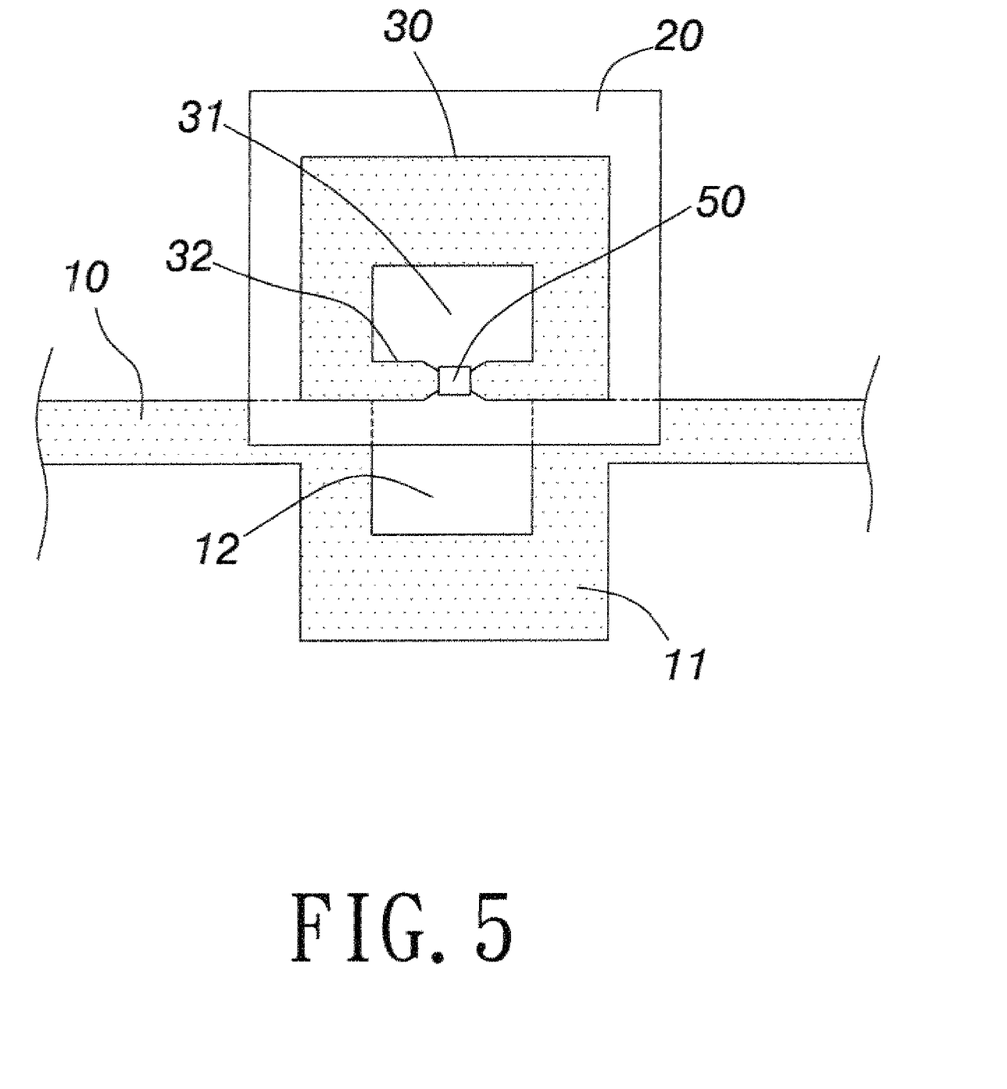
FIG. 5 shows a first schematic view of an implementation position of a foldback circuit of the present invention.
Figure 6:
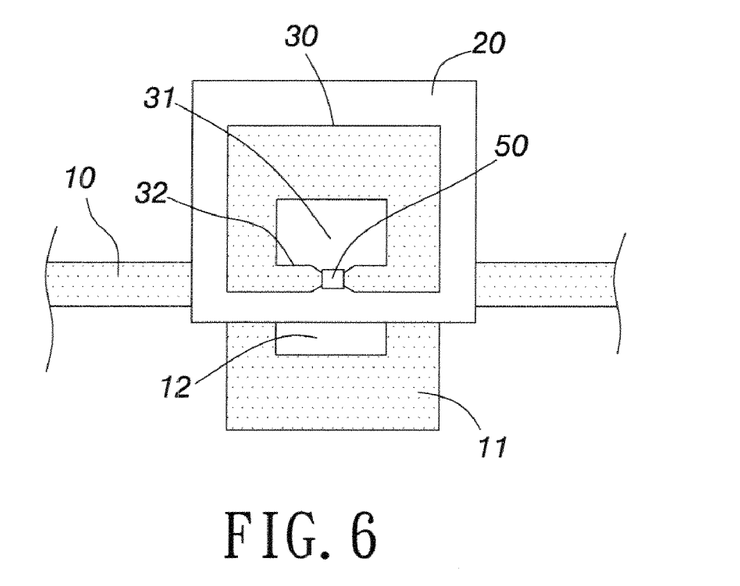
FIG. 6 shows a second schematic view of an implementation position of a foldback circuit of the present invention.
Figure 7:
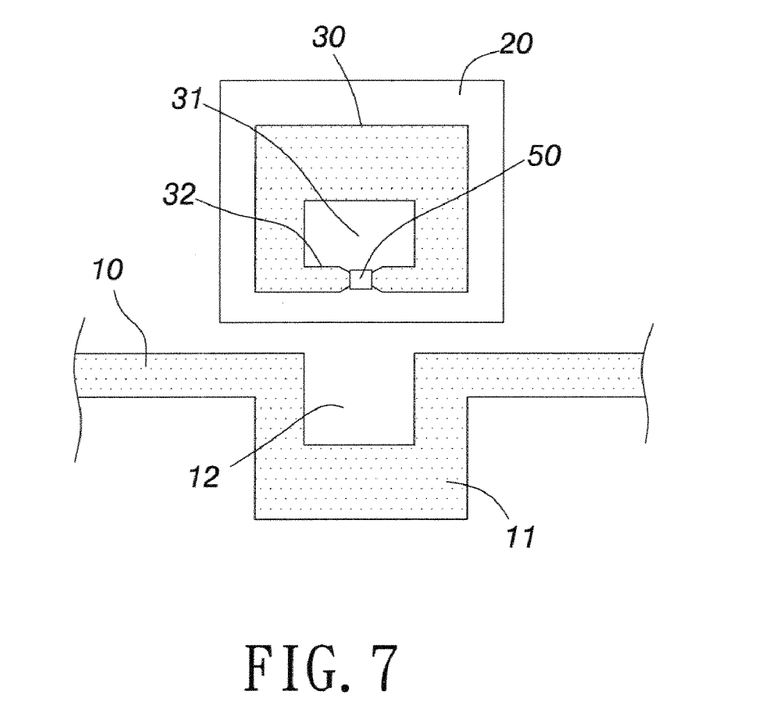
FIG. 7 shows a third schematic view of an implementation position of a foldback circuit of the present invention.

Referring to FIGS. 5 to 7, as the signals are transmitted by the electromagnetic induction between the aforementioned foldback circuit 30 and the coupling part 11, thus in a real application, only a part of the aforementioned foldback circuit 30 which includes the RFIC 50 needs to be arranged side by side vertically with, overlapped with or close to an edge of the coupling part 11 of the antenna body 10 by the non-conductive insulation layer, without requiring to be electrically connected with the coupling part 11, nor requiring to specifically provide on the antenna body 10 with a magnetic coupling element, that induction with the antenna body 10 can be achieved. Therefore, large tolerances of up, down, left and right positioning locations and angles are available in manufacturing, without requiring high precision and high cost production equipment to fix the foldable circuit 30 on the antenna body 10, that the transponder can be produced, thereby effectively reducing production cost.

Referring to FIG. 3, upon implementation, the aforementioned insulation layer 20 that is provided between the coupling part 11 and the foldback circuit 30 can be a substrate material of the foldback circuit 30, such as plastic or paper, or can be also made by non-conductive insulation ink, paint, hot melt adhesive or pressure sensitive adhesive, which is first printed or coated on a corresponding position of the coupling part 11 of the antenna, to form a non-conductive insulation layer. Next, the foldback circuit 30 which electrically connects the RFIC 50 is attached and fixed at a corresponding position of the coupling part 11 of the antenna body 10. On the other hand, in attaching, double side tape, adhesion agent, ultrasonic welding, high-frequency welding or thermo-compression can be used as well.

Naturally, it is also feasible to use an ordinary manufacturing process, such as copper or aluminum etching, electroplating, vapor deposition or sputtering, to depose or form the foldback circuit 30 on the insulation layer 20.

Besides, the antenna body 10 can be also printed on the non-conductive antenna substrate 40 using thermo cure conductive ink which contains silver or UV curable silver conductive ink which contains silver, which can reduce the production cost significantly. Certainly, it is also feasible to use the aforementioned ordinary manufacturing process, such as copper or aluminum etching, electroplating, vapor deposition or sputtering, to provide or form the antenna body 10 on the antenna substrate 40.

In addition, as the technology of printed electronics is getting matured, the conventional RFID chip can be also replaced by the printed electronics RFIC 50; that is, after printing the foldback circuit 30 on the insulation layer 20, the printed electronics RFIC 50 is then printed on the foldback circuit 30, which can decrease a work procedure and facilitate fully automatic production, thereby reducing the production cost significantly.

Figure 8:
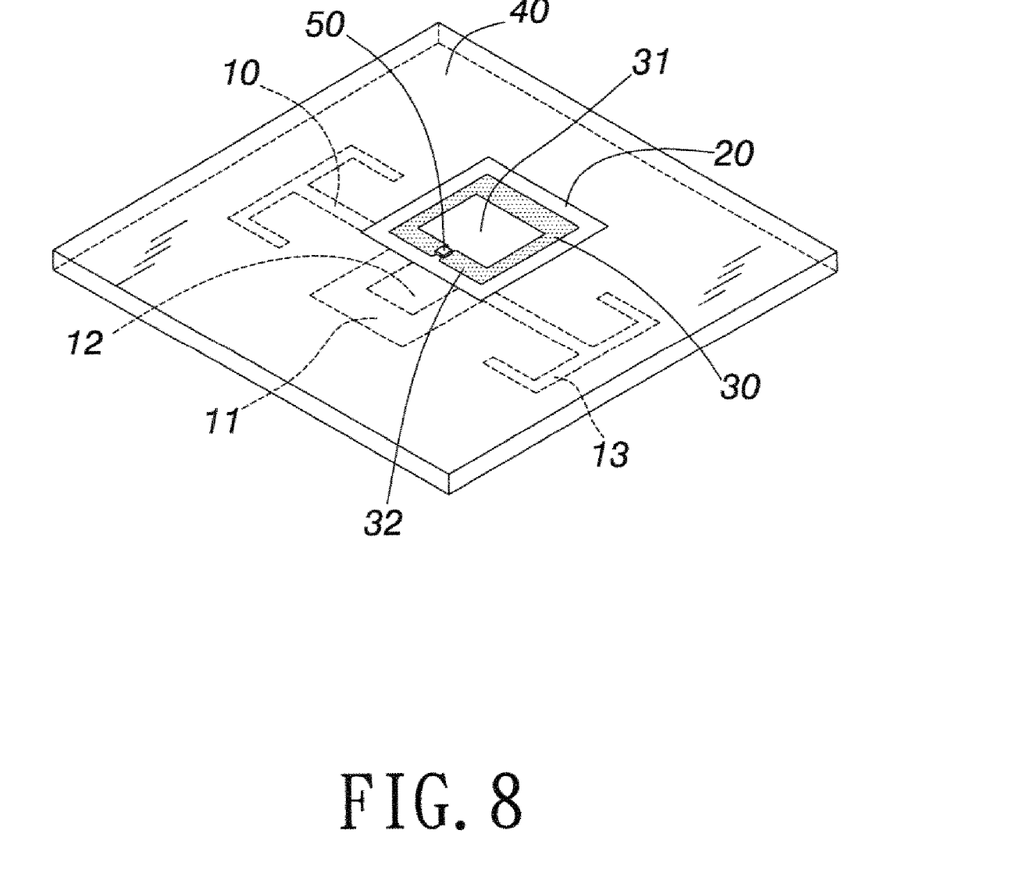
FIG. 8 shows a schematic view of a second embodiment of an antenna structure of the present invention.

As the present invention utilizes the electromagnetic induction to transmit the signals, when the antenna body 10 and the foldback circuit 30, RFIC 50 are implemented, the coupling part 11 of the antenna body 10 can be provided with the insulation layer 20 and the foldback circuit 30, as shown in a schematic view of a structure of a second embodiment of the present invention in FIG. 8; wherein, the coupling part 11 is in the winding shape and is provided with the gap 12, whereas the antenna body 10 is extended outward from two sides of the coupling part 11 to form the antenna parts 13.

The antenna body 10 is provided at a rear side of the non-conductive antenna substrate 40. The foldback circuit 30 is provided with the opening 31, and is extended inward from two sides of the opening 31 to approach conductive parts 32. In addition, the RFIC 50 is provided at the opening 31 or between the conductive parts 32 at two sides. The foldback circuit 30 and the RFIC 50 are provided on the insulation layer 20 and are attached on the antenna substrate 40, such that the foldback circuit 30 can correspond vertically with the coupling part 11 of the antenna body 10, and the opening 31 of the foldback circuit 30 and the RFIC 50 can face toward an opening of the gap 12 of the coupling part 11.

Figure 9:
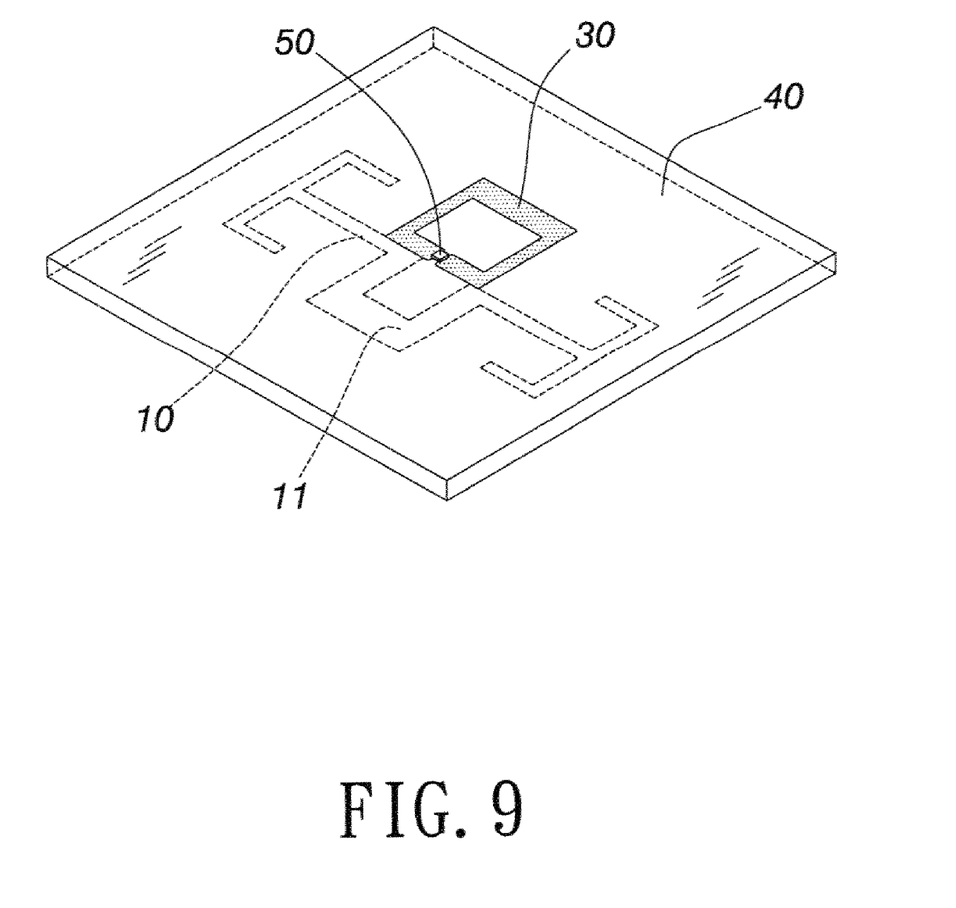
FIG. 9 shows a schematic view of a third embodiment of an antenna structure of the present invention.

Referring to FIG. 9, it shows a schematic view of a structure of a third embodiment of the present invention. The antenna body 10 is provided at the rear side of the non-conductive antenna substrate 40, whereas the foldback circuit 30 and the RFIC 50 are directly provided on a front side of the antenna substrate 40, at positions corresponding to the coupling part 11, allowing the non-conductive antenna substrate 40 to form the insulation layer between the antenna body 10 and the RFIC 50 of the foldback circuit 30.

Figure 10:
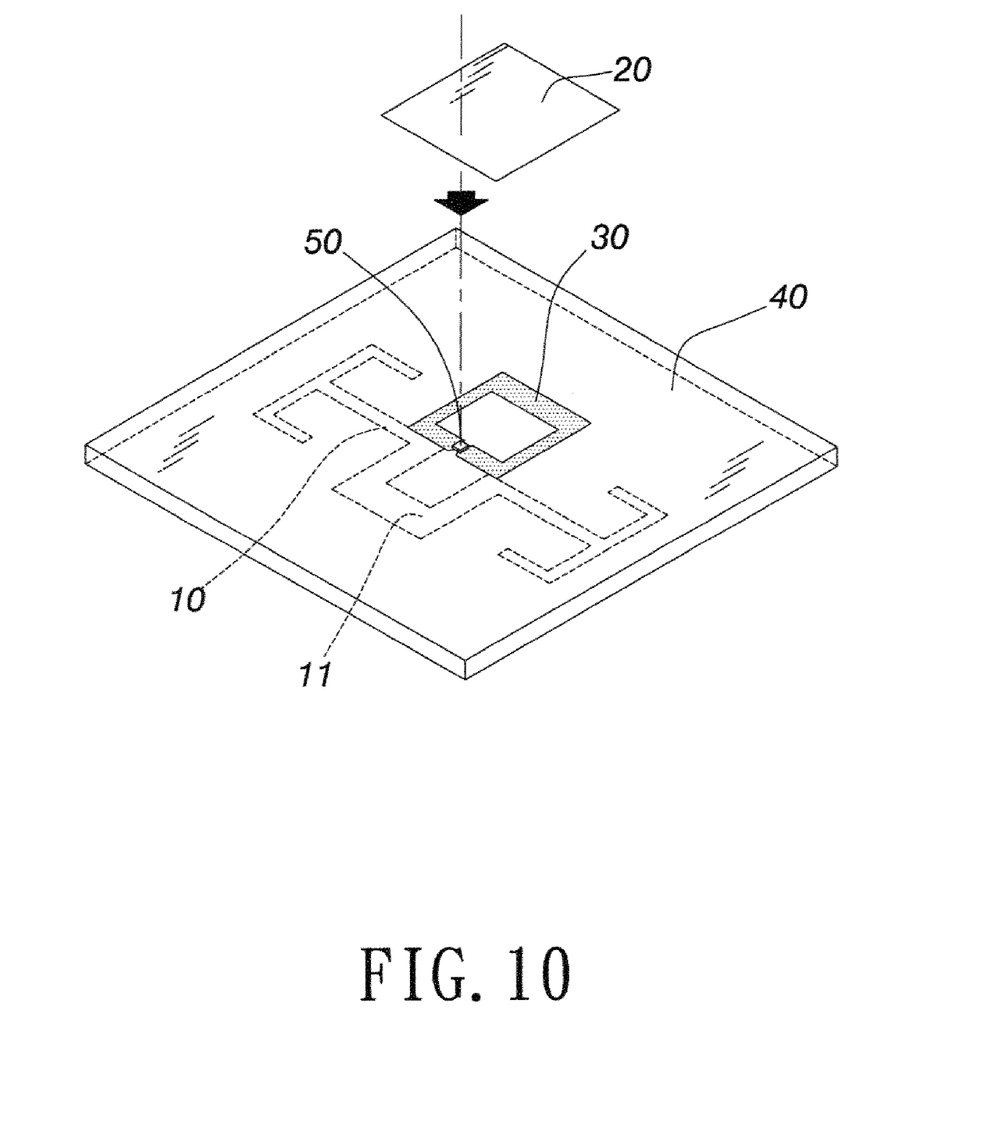
FIG. 10 shows a schematic view of a fourth embodiment of an antenna structure of the present invention.

Referring to FIG. 10, it shows a schematic view of a structure of a fourth embodiment of the present invention. The antenna body 10 is provided on the rear side of the non-conductive antenna substrate 40, whereas the foldback circuit 30 and the RFIC 50 are directly provided on the front side of the antenna substrate 40, at the positions corresponding to the coupling part 11, allowing the non-conductive antenna substrate 40 to form the insulation layer between the antenna body 10 and the RFIC 50 of the foldback circuit 30.

Figure 11:
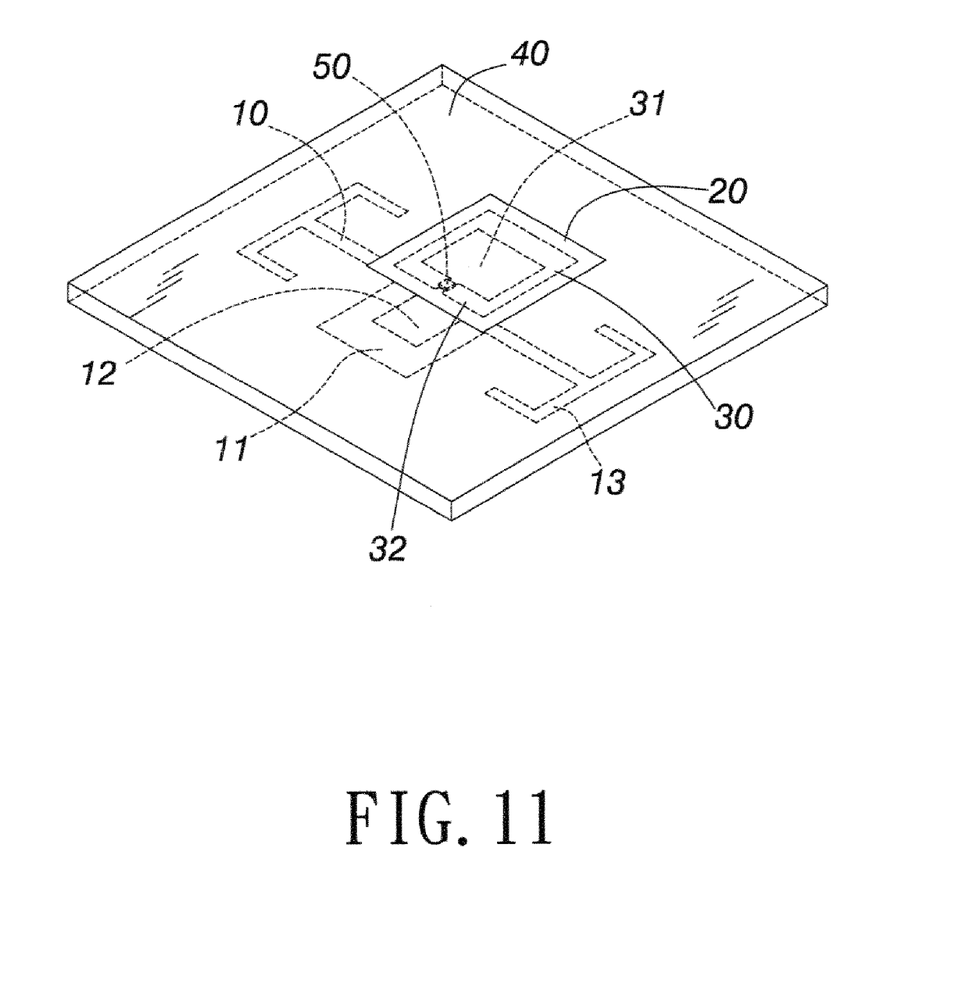
FIG. 11 shows an assembly view of a fourth embodiment of an antenna structure of the present invention.

Referring to FIG. 11, for the aforementioned embodiments that the antenna body 10 is provided on the rear side of the non-conductive antenna substrate 40, and the foldback circuit 30 and the RFIC 50 are directly provided on the front side of the antenna substrate 40, at the positions corresponding to the coupling part 11, an exterior surface of the foldback circuit 30, far away from the antenna substrate 40, is further attached with the insulation layer 20 constituted by plastic or paper, and is fixed on the foldback circuit 30. Of course, this insulation layer 20 can serve as the substrate material of the foldback circuit 30 as well. In attaching, pressure sensitive adhesive, double side tape, adhesion agent, hot melt adhesive, ultrasonic welding, high-frequency welding or thermo-compression can be used. In addition, non-conductive insulation ink, paint or pressure sensitive adhesive can be also printed or coated on the foldback circuit 30 to form the insulation layer 20.

Figure 12:
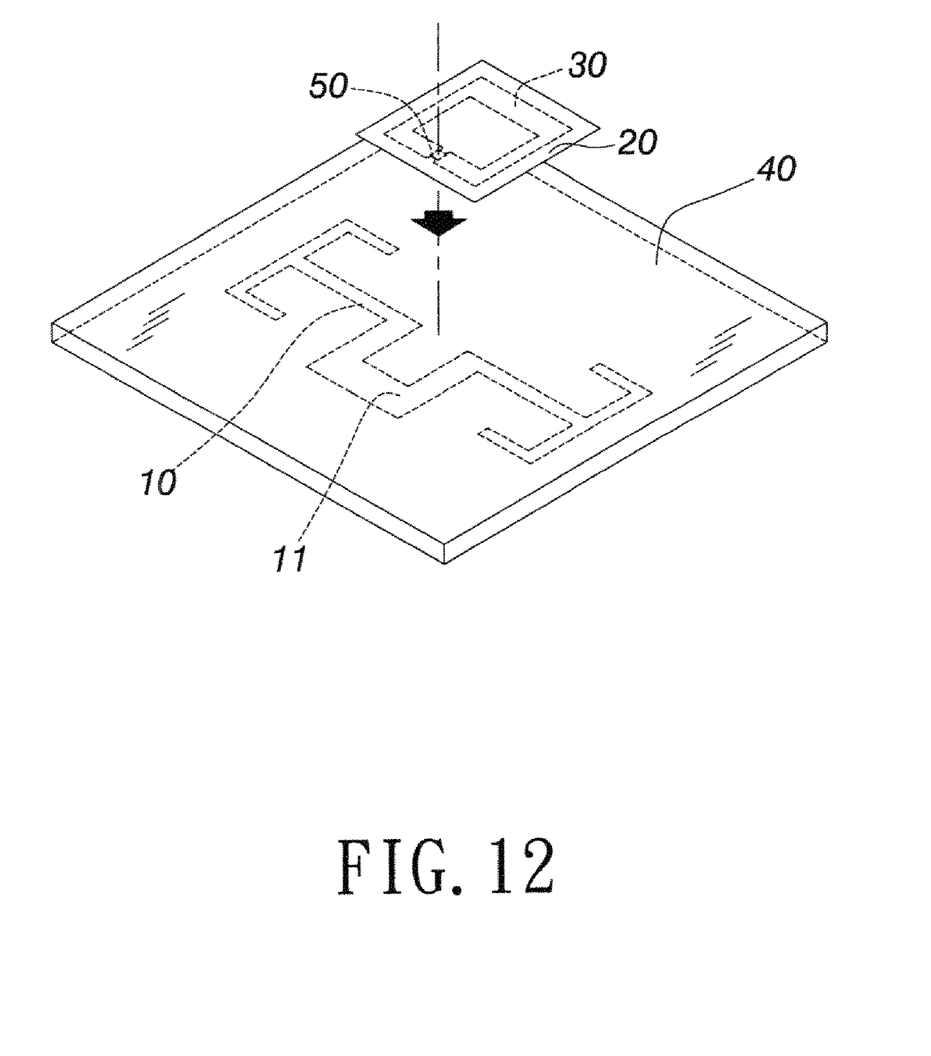
FIG. 12 shows a schematic view of a structure of a fifth embodiment of the present invention.

For the aforementioned structure that the antenna substrate 40 is located between the antenna body 10 and the foldback circuit 30, in addition to first providing the foldback circuit 30 and then the insulation layer 20, when implementing, the antenna 10 can be also printed on the rear side of the non-conductive antenna substrate 40, as shown in FIG. 12. Next, a rear side of the insulation layer 20 is provided with the foldback circuit 30, and the foldback circuit 30 is provided with the RFIC 50, followed by attaching the insulation layer 20 and the foldback circuit 30 on the front side of the antenna substrate 40, such that the antenna substrate 40 can be located between the foldback circuit 30 and the antenna 10, and the insulation layer 20 can be provided on the exterior surface of the foldback circuit 30 far away from the antenna substrate 40.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An antenna structure of a radio frequency identification system transponder, comprising an antenna body which is provided with a coupling part, an insulation layer and a foldback circuit, wherein a gap of the foldback circuit, corresponding to the coupling part, oppositely faces toward a gap of the coupling part, with an opening being provided with an RFIC (Radio Frequency Interface Chip) that connects the foldback circuit to form a loop circuit; the insulation layer being provided between the coupling part of the antenna body and the foldback circuit.

2. The antenna structure of a radio frequency identification system transponder, according to claim 1, wherein the antenna body is provided on a non-conductive antenna substrate, the loop circuit is provided on the insulation layer, and the insulation layer is attached on the antenna body.

3. The antenna structure of a radio frequency identification system transponder, according to claim 2, wherein a part of edge of the loop circuit is arranged side by side vertically with a part of edge of the coupling part of the antenna body.

4. The antenna structure of a radio frequency identification system transponder, according to claim 2, wherein a part of the loop circuit is overlapped vertically with a part of the coupling part of the antenna body.

5. The antenna structure of a radio frequency identification system transponder, according to claim 2, wherein a part of edge of the loop circuit is close to a part of edge of the coupling part of the antenna body vertically.

6. The antenna structure of a radio frequency identification system transponder, according to claim 2, wherein the loop circuit that is constituted by the foldback circuit and the RFIC a square loop circuit, a circular loop circuit, an elliptical lop circuit, a rectangular loop circuit, a triangular loop circuit or a polygonal loop circuit.

7. The antenna structure of a radio frequency identification system transponder, according to claim 1, wherein the RFIC is a printed electronics RFIC.

8. The antenna structure of a radio frequency identification system transponder, according to claim 1, wherein the coupling part is in a winding shape.

9. The antenna structure of a radio frequency identification system transponder, according to claim 1, wherein a part of edge of the loop circuit is arranged side by side vertically with a part of edge of the coupling part of the antenna body.

10. The antenna structure of a radio frequency identification system transponder, according to claim 1, wherein a part of the loop circuit is overlapped vertically with a part of the coupling part of the antenna body.

11. The antenna structure of a radio frequency identification system transponder, according to claim 1, wherein a part of edge of the loop circuit is close to a part of edge of the coupling part of the antenna body vertically.

12. The antenna structure of a radio frequency identification system transponder, according to claim 1, wherein the loop circuit that is constituted by the foldback circuit and the RFIC is a square loop circuit, a circular loop circuit, an elliptical lop circuit, a rectangular loop circuit, a triangular loop circuit or a polygonal loop circuit.

13. The antenna structure of a radio frequency identification system transponder, according to claim 1 wherein an exterior surface of the loop circuit, far away from the antenna substrate, is provided with an insulation layer.

14. The antenna structure of a radio frequency identification system transponder, according to claim 13, wherein a part of edge of the loop circuit is arranged side by side vertically with a part of edge of the coupling part of the antenna body.

15. The antenna structure of a radio frequency identification system transponder, according to claim 13, wherein a part of the foldback circuit is overlapped vertically with a part of the coupling part of the antenna body.

16. The antenna structure of a radio frequency identification system transponder, according to claim 13, wherein a part of edge of the loop circuit is close vertically to a part of edge of the coupling part of the antenna body.

17. The antenna structure of a radio frequency identification system transponder, according to claim 13, wherein the loop circuit that is constituted by the foldback circuit and the RFIC is a square loop circuit, a circular loop circuit, an elliptical loop circuit, a rectangular loop circuit, a triangular loop circuit or a polygonal loop circuit.

18. The antenna structure of a radio frequency identification system transponder, according to claim 1 wherein the RFIC is a printed electronics RFIC.

19. An antenna structure of a radio frequency identification system transponder, comprising an antenna body which is provided with a coupling part, an antenna substrate and a foldback circuit, wherein the antenna body is provided on the non-conductive antenna substrate, and the foldback circuit is provided on a rear side of the antenna substrate and corresponds to the antenna body; a gap of the foldback circuit that corresponds to the coupling part, oppositely faces toward a gap of the coupling part; an opening being provided with an RFIC that connects the foldback circuit to form a loop circuit.

20. The antenna structure of a radio frequency identification system transponder, according to claim 19, wherein the coupling part is in a winding shape.

21. The antenna structure of a radio frequency identification system transponder, according to claim 19, wherein a part of edge of the loop circuit is arranged side by side vertically with a part of edge of the coupling part of the antenna body.

22. The antenna structure of a radio frequency identification system transponder, according to claim 19, wherein a part of the loop circuit is overlapped vertically with a part of the coupling part of the antenna body.

23. The antenna structure of a radio frequency identification system transponder, according to claim 19, wherein a part of edge of the loop circuit is close vertically to a part of edge of the coupling part of the antenna body.

24. The antenna structure of a radio frequency identification system transponder, according to claim 19, wherein the loop circuit that is constituted by the foldback circuit and the RFIC is a square loop circuit, a circular loop circuit, an elliptical loop circuit, a rectangular loop circuit, a triangular loop circuit or a polygonal loop circuit.

* * * * *